United States Patent [19]

Cassata

[11] Patent Number: 5,219,986
[45] Date of Patent: Jun. 15, 1993

[54] POLYANHYDROASPARTIC ACID AND METHOD OF DRY MANUFACTURE OF POLYMERS

[75] Inventor: Thomas A. Cassata, Palos Park, Ill.

[73] Assignee: Cygnus Corporation, Dolton, Ill.

[21] Appl. No.: 783,355

[22] Filed: Oct. 28, 1991

Related U.S. Application Data

[63] Continuation of Ser. No. 420,960, Oct. 13, 1989, abandoned.

[51] Int. Cl.$^5$ ................................................ C07K 7/10
[52] U.S. Cl. ..................................... 530/324; 528/328
[58] Field of Search ........................... 530/324; 514/12; 528/328

Primary Examiner—Lester L. Lee
Attorney, Agent, or Firm—Wallenstein, Wagner & Hattis, Ltd.

[57] ABSTRACT

The invention is a process of manufacture, and a product manufactured by that process. The process comprises various steps. The steps include charging aspartic acid particles into a process unit and heating those particles to approximately 400°–480° F. As the aspartic acid particles are heated, vacuum is applied to that unit. Water is removed from the aspartic acid to form polyanhydroaspartic acid.

10 Claims, 1 Drawing Sheet

POLYANHYDROASPARTIC ACID AND METHOD OF DRY MANUFACTURE OF POLYMERS

This is a continuation of copending application Ser. No. 07/420,960 filed on Oct. 13, 1989 and now abandoned.

DESCRIPTION

1. Technical Field

The invention relates generally to a novel method for the manufacture of polyanhydroaspartic acid. It also relates to a method of manufacturing that acid and other polymers without first placing their monomers in solutions or liquid suspensions. Finally, the invention discloses a novel form of polyanhydroaspartic acid that is believed to have improved properties over conventional forms of that acid made by previously known processes.

2. Background of the Invention

Polyanhydroaspartic acid is old in the art. Methods of manufacturing this acid or its derivatives have been described in the literature for over thirty years. See page 3365 of Vegotsky, Harada, and Fox, "The Characterization of Polyaspartic Acid and Some Related Compounds," J. Am. Chem. Soc., 80, 3361 (1958).

Other methods generally relevant to this invention are disclosed in six United States patents known to the inventor. These include Harada et al. U.S. Pat. No. 4,696,981, issued on Sep. 29, 1987; Ushimaru et al. U.S. Pat. No. 4,702,918, issued on Oct. 27, 1987; Kohn et al. U.S. Pat. No. 4,638,045, issued on Jan. 20, 1987; Boehmke U.S. Pat. No. 4,839,461, issued Jun. 13, 1989; Saudek et al U.S. Pat. No. 4,745,161, issued on May 17, 1988; and Zappia et al. U.S. Pat. No. 4,772,463, issued on Sep. 20, 1988.

Harada discloses a method of manufacturing anhydropolyaspartic acid by radiating various salts of malic acid, maleic acid, fumaric acid and mixtures thereof.

Ushimaru discloses the use of a three-component mixture to form a sustained release composition. One of the three components forms a gel in water, and can include polyaspartic acid. Ushimaru discloses the manufacture of that sustained release composition by reacting the three components in a fluidized bed.

Kohn describes, at Examples I–VII, the manufacture of various compositions, including tyrosine alkyl esters, tyrosine methyl esters, tyrosine hydrazide, tyrosine ethyl esters, and dicyanates. Kohn suggests that aspartic acid may be used as a monomer in the preparation of such compounds. Conventional flasks, buchner funnels, separatory funnels, and rotary evaporators are used in the preparation.

Boehmke discloses the manufacture of polyaspartic acid from maleic acid in ammonia at 125°–135° C. Saudek pertains to the manufacture of a biodegradable copolymer which includes in its main chain aspartic or glutamic acid.

Zappia pertains to CDP-Choline derivatives with macromolecules containing carboxy groups.

Current commercially available laundry detergents include agents for preventing precipitates, such as carbonates, from wash water. Such agents now include acrylic or polyacrylic acids. However, acrylic or polyacrylic acids are disadvantageous, in that they are not biodegradable.

Previous methods of manufacturing aspartic acids and its polymeric derivatives resulted in low yields of acceptable product, and in a product having a relatively high cost. One important measure of substitutability of polyaspartic acid for polyacrylic acid is its ability to retain carbonates in a solution, i.e., to inhibit calcium formation. The value of polyaspartic acid is partially determined by its ability to inhibit calcium and other alkaline earth salt formation. Thus, the greater the ability to inhibit such formation, the greater the value of the acid.

SUMMARY OF THE INVENTION

The invention is a process of manufacture, and a product manufactured by that process. The process comprises various steps. The steps include charging aspartic acid particles into a process unit and heating the particles in the process unit to a temperature of approximately 400°–480° F. The aspartic acid particles are heated in said process unit, and vacuum is applied to that unit. Water is removed from the aspartic acid by polymerization and a cyclization reaction, to form polyanhydroaspartic acid.

In one embodiment of the invention, water is drawn from the process unit through a condenser. The process unit is heated with the heat transfer fluid for approximately seven hours. The process unit is a dryer having agitating plows. In another preferred embodiment, the aspartic acid particles are agitated and fluidized by plows moving within the dryer at approximately 155 revolutions per minute.

It has been found that the polyanhydroaspartic acid manufactured in accordance with the present invention exhibits superior calcium inhibition, after base hydration, over any form of that acid previously known to the inventor. It has also been found that the acid made in accordance with the invention can be manufactured significantly more economically than with any previously known method. These two factors, combined with the biodegradability of polyaspartic acid formed by such hydration, result in the suitability of the polyaspartic acid as a substitute for polyacrylic acid salts.

DETAILED DESCRIPTION OF THE PREFERRED EMBODIMENT

Figure 1:
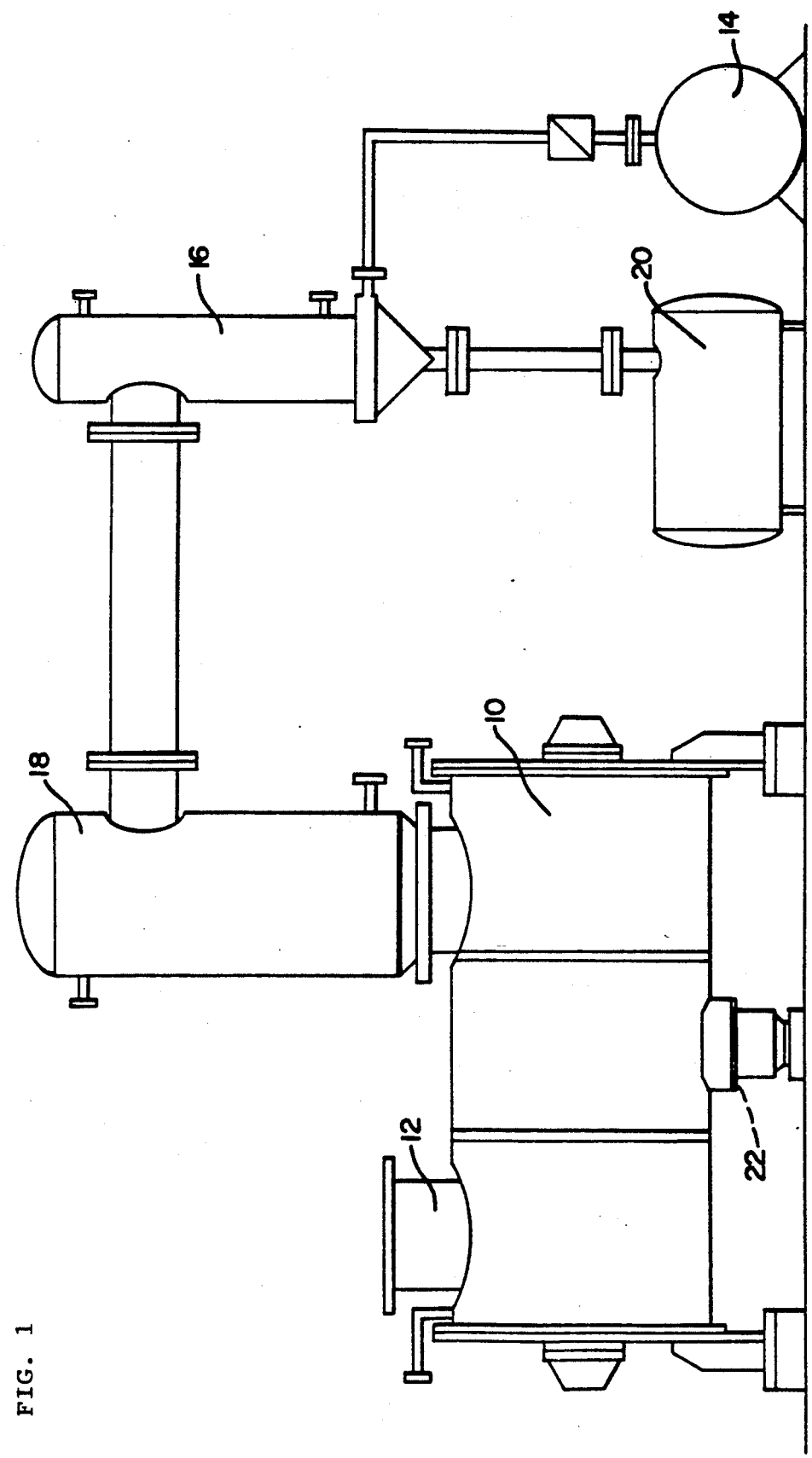
FIG. 1 is a schematic view of the equipment required in the process of the present invention.

While this invention is susceptible of embodiment in many different forms, there is shown in the drawings and will herein be described in detail preferred embodiments of the invention. It should be understood, however, that the present disclosure is to be considered an exemplification of the principles of the invention. It is not intended to limit the broad aspect of the invention to the embodiment or embodiments illustrated.

The invention is a composition of matter, that is, a form of polyanhydroaspartic acid made by a certain method. The invention is also the method of making that acid.

The apparatus used for this method is shown in FIG. 1. The principal process unit is jacketed dryer 10, model no. FM-130, manufactured by Littleford Brothers, 7451 Empire Drive, Florence, Ky. The dryer contains agitating and fluidizing plows.

The agitating and fluidizing plows preferred are so-called heat transfer plows. These plows are irregularly shaped, and rotate on a shaft along the horizontal axis of the dryer. The ends of these plows extend to a point near the inner surface of the dryer. In this dryer, four heat transfer plows are secured to the shaft. Preferably, the shaft rotates at 155 rpm.

The acid itself is made by a multi-step method. In the first step of the preferred embodiment of that method, 100 pounds of L-aspartic acid is charged through the wet product port 12 of the jacketed Littleford dryer 10. The L-aspartic acid is available from Pfizer, Inc., Pfizer Chemical Division, 235 East 42d Street, New York, N.Y. 10017.

Heat transfer fluid at 500° F. is circulated through the jacket of the dryer 10. With this fluid, the temperature of the aspartic acid is ultimately raised to between 400° F. and 480° F. Simultaneously with the commencement of this circulation, the agitating plows in the dryer are started, and vacuum of about 8 inches Hg is applied to the dryer through a conventional vacuum pump 14. This vacuum pump 14 is connected by piping to a condenser 16 and a vacuum stack 18 integrally mounted to the top of the jacketed dryer 10.

The system shown in FIG. 1 promotes liquid evaporation at temperatures much lower than conventional "open air" or atmospheric hot air systems. The vapors are urged by evaporation from the dryer into the top-mounted vacuum stack. There is a drop in vapor pressure across the condenser. This creates a vapor pressure differential within the system, which pulls vapor from the dryer to the condenser. The cold water into this condenser cools these vapors, and causes the vapors to condense back into liquid. The condensate flows into a recovery tank 20 for subsequent use.

Within approximately eighteen minutes from the placement of vacuum on the system, the temperature of the product within the dryer 10 will have reached approximately 375° F. The reaction essentially comprises the removal of water from aspartic acid to form polyanhydroaspartic acid, and this removal is first evidenced by water passing into the recovery tank at eighteen minutes.

At one hour after placement of vacuum on the system, approximately four to five pounds of water has accumulated in the recovery tank. The water recovery continues at approximately five pounds per hour, and at five hours after placement of vacuum on the system 95% of the theoretical water in the conversion of L-aspartic acid to polyanhydroaspartic acid has been removed. The vessel is heated for an additional two hours. After the product has cooled, it is removed through the dried product port 22 at the bottom of the tank 10.

Using this embodiment, one-hundred (100) pounds of L-aspartic acid will yield twenty-seven (27) pounds of water and seventy-three (73) pounds of polyanhydroaspartic acid.

The invention is also a method of dry polymerization. This method of dry polymerization comprises charging a particulate monomer that is neither in solution nor suspension to a process unit. This particulate monomer is then agitated in the process unit and vacuum is applied to the process unit. Finally, water is removed from the particulate monomer to form a polymer. In one preferred aspect of this method, the water is drawn from the process unit with a condenser.

The best mode contemplated for carrying out the invention has been disclosed in this specification. However, the broad claims of the specification, which may not specify details of yet another embodiment, are not limited to embodiments which include only details disclosed in this specification. Furthermore, while specific claimed details constitute important aspects of this invention, the claims of the specification must be construed in light of the doctrine of equivalents.

What I claim is:

1. A product manufactured by the process of:
   (a) charging aspartic acid particles into a fluidizing process unit;
   (b) heating said fluidizing process unit with a heat transfer fluid at approximately 500° F.;
   (c) agitating said aspartic acid particles in said fluidizing process unit;
   (d) applying vacuum to said fluidizing process unit; and
   (e) removing water from said aspartic acid to form said product.

2. The product made by the method of claim 1, wherein said water is drawn off from said fluidizing process unit through a condenser.

3. The product made by the method of claim 1, wherein said fluidizing process unit is heated with said heat transfer fluid for approximately seven hours.

4. The product made by the method of claim 1, wherein said fluidizing process unit is a dryer having agitating plows.

5. The product made by the method of claim 4, wherein said aspartic acid particles are agitated by said plows at approximately 155 revolutions per minute.

6. A process for the manufacture of a polyanhydroaspartic acid, comprising:
   (a) charging aspartic acid particles into a fluidizing process unit;
   (b) heating said fluidizing process unit with a heat transfer fluid at approximately 500° F.;
   (c) agitating said aspartic acid particles in said fluidizing process unit;
   (d) applying vacuum to said fluidizing process unit; and
   (e) removing water from said aspartic acid to form said polyanhydroaspartic acid.

7. The process of claim 6, wherein said water is drawn off from said fluidizing process unit through a condenser.

8. The process of claim 6, wherein said fluidizing process unit is heated with said heat transfer fluid for approximately seven hours.

9. The process of claim 6, wherein said fluidizing process unit is a dryer having agitating plows.

10. The process of claim 9, wherein said aspartic acid particles are agitated by said plows at approximately 155 revolutions per minute.

* * * * *